US005199504A

United States Patent [19]

Dang

[11] Patent Number: 5,199,504

[45] Date of Patent: Apr. 6, 1993

[54] HIGH EFFICIENCY PNEUMATIC IMPACTING MECHANISM WITH A PLUNGER VALVE

[76] Inventor: Zhi-Guo Dang, No. 74 A, Xiying Road, Xi'an, China

[21] Appl. No.: 753,731

[22] Filed: Sep. 3, 1991

[30] Foreign Application Priority Data

Sep. 15, 1990 [CN] China ........................ 90 2 20630.3

[51] Int. Cl.[5] ........................ B23Q 5/033; F01B 25/02

[52] U.S. Cl. ........................ 173/17; 173/206; 91/297; 92/85 A

[58] Field of Search ........................ 173/13, 15, 16, 17, 173/119, 134, 206, 207; 91/297; 92/85 A

[56] References Cited

U.S. PATENT DOCUMENTS

| | | | |
|---|---|---|---|
| 428,672 | 5/1890 | Frost | 91/297 |
| 816,021 | 3/1906 | Leyner | 91/297 |
| 909,923 | 1/1909 | Mitchell | 91/297 |
| 1,740,713 | 12/1929 | Rundqvist | 173/16 |
| 2,228,338 | 1/1941 | Bennett | 91/297 |
| 2,831,933 | 4/1958 | Schrameck et al. | 92/85 A |
| 4,179,983 | 12/1979 | Wallace | 173/134 |
| 4,240,332 | 12/1980 | Deutsch | 92/85 A |
| 5,056,606 | 10/1991 | Barthomeuf | 173/13 |

*Primary Examiner*—Frank T. Yost
*Assistant Examiner*—Scott A. Smith
*Attorney, Agent, or Firm*—Leonard Bloom

[57] ABSTRACT

A pneumatic impacting mechanism comprising a first cylinder and a piston with a rear air distributing bar and a front air distributing bar which simultaneously acts as an impacting head of the same, said rear distributing bar having an axially extending air inlet channel, which in turn can be connected, through a radial air channel in the piston, alternatively with a pair of air inlet channels leading to a second cylinder of a plunger valve, said plunger valve being provided with two annular grooves at both ends for alternatively controlling two air inlet channels and two air exhaust channels. In this manner, the quantities of compressed air entering into the first cylinder during forward and backward strokes are determined by the lengths of the two distributing bars. Moreover, two air buffer chambers are provided at both ends of the first cylinder so that the compressed air doing work within said first cylinder can expand to approximately atmosphere. With the back pressure of the piston reduced considerably, the energy of compressed air can be made full use of.

3 Claims, 2 Drawing Sheets

FIG. 1
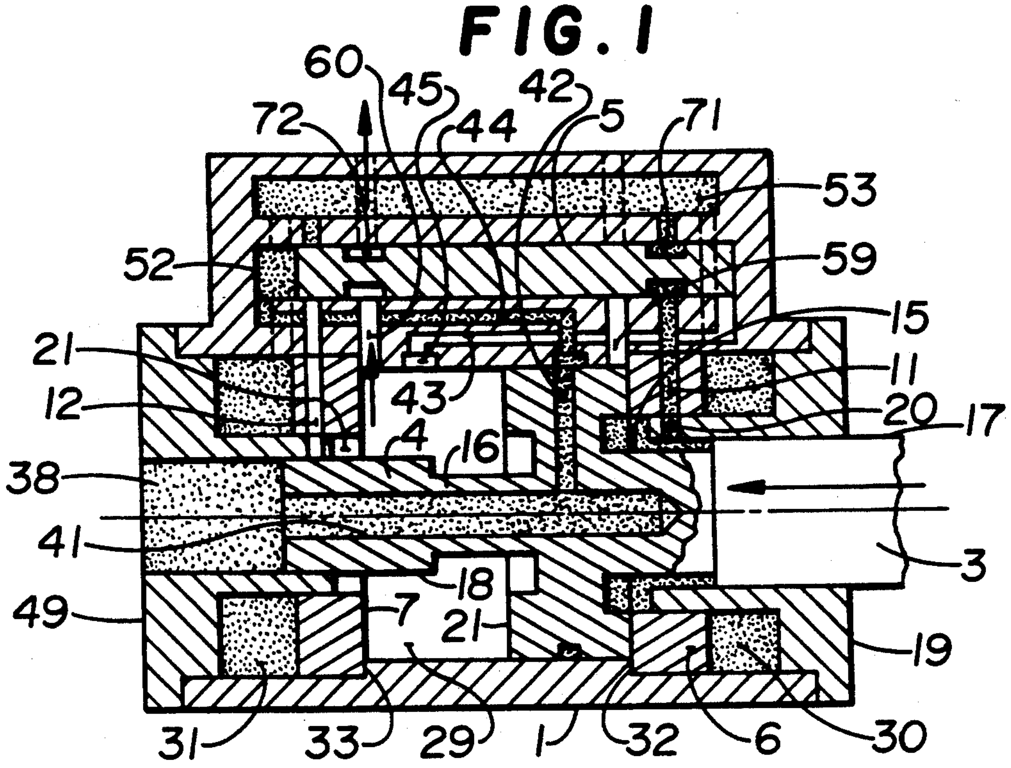
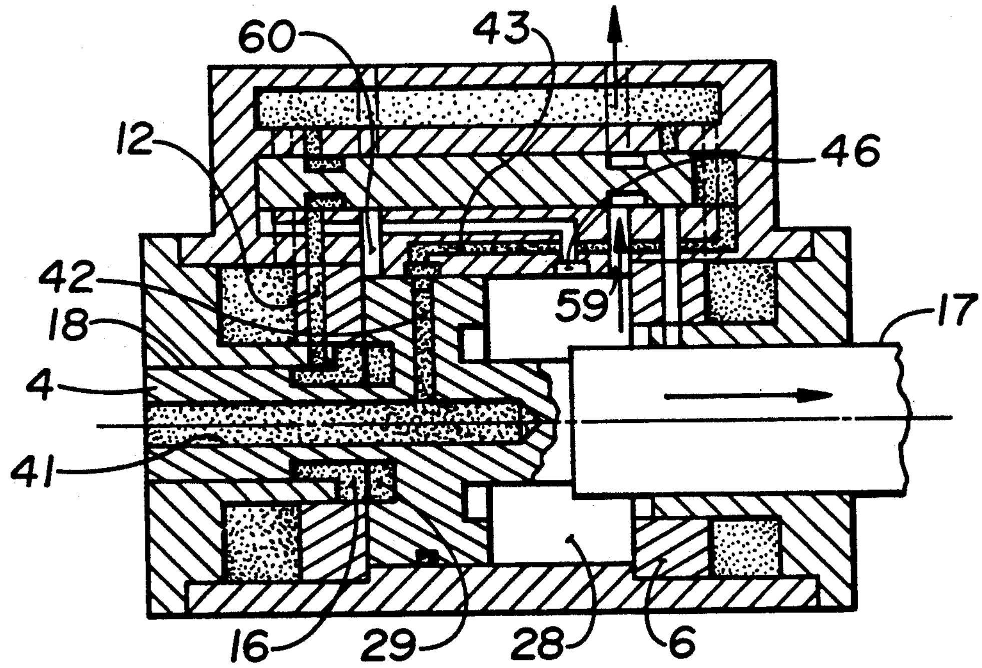
FIG. 2

HIGH EFFICIENCY PNEUMATIC IMPACTING MECHANISM WITH A PLUNGER VALVE

BACKGROUND OF INVENTION

This invention relates to a pneumatic impacting mechanism, in particular to a pneumatic rock drill for mineral use.

Impacting devices driven by compressed air, such as rock drill, pneumatic pick, pneumatic riveter, etc., are widely used nowadays. However, they are all of a low efficiency in respect of energy use, since with most devices only 26-35% of the effective energy contained in compressed air is made use of.

The structure of a traditional rock drill is shown in FIGS. 4 and 5. When valve 40 is at extreme left, as shown in FIG. 4, the compressed air 31 enters into a rear chamber 29 of the cylinder 1 through an air channel 35, to push a piston 2 forward, while the front chamber 28 of the cylinder is connected to atmosphere. After face A—A of the piston 2 passes by an air exhaust hole 71, the air remaining in chamber 28 is compressed by a forward movement of the piston 2. A pneumatic cushion thus formed will consume the kinetic energy of the piston 2, and the piston 2 is connected with an impacting head of the device. When face B—B of the piston 2 passes by said exhaust hole 71, as shown in FIG. 5, the rear chamber 29 is connected to atmosphere, so that the pressure within this chamber drops all of a sudden. At the same time, the front chamber 28 is connected to the back side of the valve 40 through an air channel 36, to move said valve 40 towards its right position, thus connecting said chamber 28 with the compressed air source 31, to start a backward stroke. The whole procedure of a backward stroke is much the same as a forward stroke.

The main features of the traditional mechanism can be summed up in the following:

1. The compressed air, supplied alternatively during a forward stroke and a backward stroke, can do work only in an isobaric state rather than an expansion state.

2. Since high pressure air is exhausted suddenly through a fixed exhaust hole, exhaustion is not only uncontinuous, but also incomplete. After exhaustion, there is sure to be certain quantity of air left in the cylinder. This portion of air is adiabatically compressed by the piston to form an air cushion. This portion of compressed air can no longer be made use of, and we call it "cushion loss". Normally, 40% of energy is lost due to continuous air supply and discontinued exhaustion at a high pressure. And in addition, 16% more energy loss is caused by an air cushion formed after adiabatical compression.

3. Another shortcoming with a traditional device is its serious noise pollution. Since exhaustion is performed at a high pressure and within a short time, a sort of pulse noise is produced, which has become a major source of noise pollution with the traditional pneumatic impacting devices.

It is obvious that the above-mentioned shortcomings are caused by a structural deficiency of the traditional mechanism, and cannot be overcomed or improved by simply changing the dimensions, materials, or the manufacturing processes.

OBJECTS OF INVENTION

The primary object of this invention is to provide an improved impacting mechanism which is completely free from the above-mentioned shortcomings of a traditional device.

Another object of the present invention is to provide an impacting mechanism with which exhaustion of air is continuous during the whole of a forward and a backward stroke, and the air entering into the cylinder can be expanded to be approximately equal to atmosphere.

A third object of this invention is to provide an impacting mechanism, with which the back pressure of the piston is always equal to atmosphere, and the kinetic energy of the piston during a backward stroke can be transformed into the kinetic energy of the same during a following forward stroke.

BRIEF DESCRIPTION OF DRAWINGS

These and other objects, as well as advantages, of the present invention will become clear by the following description of the invention, as well as a preferred embodiment, with reference to the attached drawings, wherein:

FIG. 1 is a sectional view of a pneumatic impacting device according to this invention, with the piston located at a position where a backward stroke is to begin;

FIG. 2 shows the same device, with the piston located at another position where a forward stroke is to start;

SUMMARY OF THE INVENTION

Figure 3:
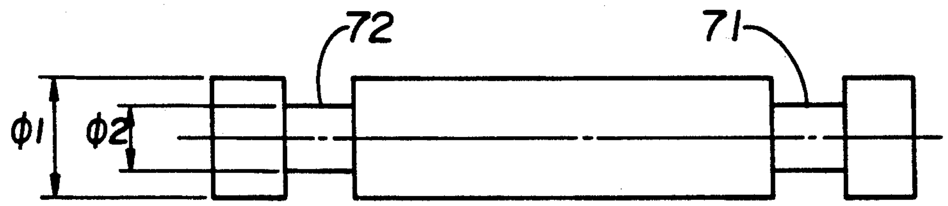
FIG. 3 illustrates the plunger valve of the device according to this invention.
Figure 4:
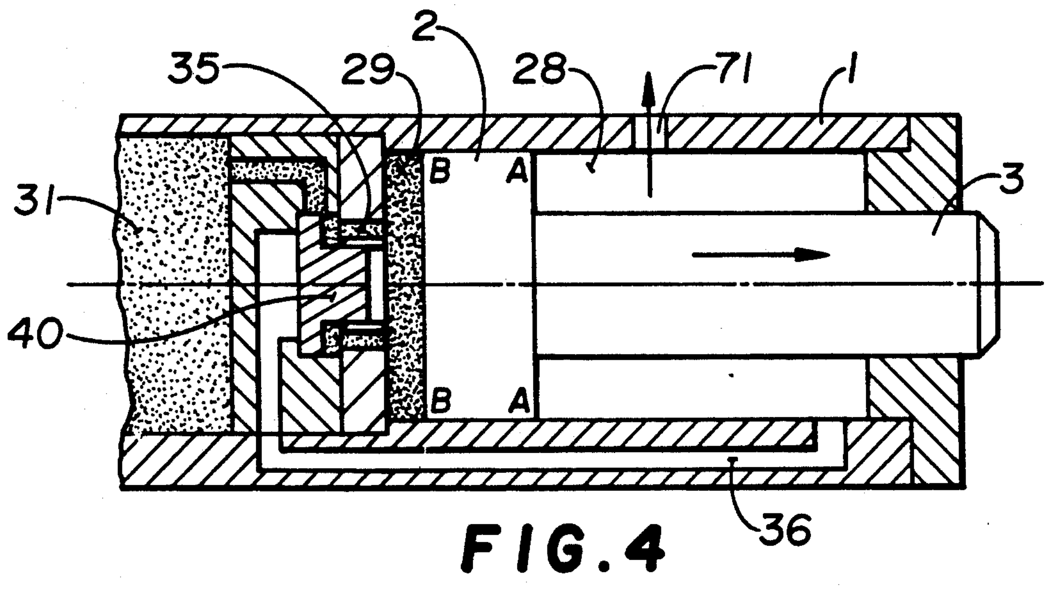
FIG. 4 illustrates a forward stroke of a traditional pneumatic impacting mechanism.
Figure 5:
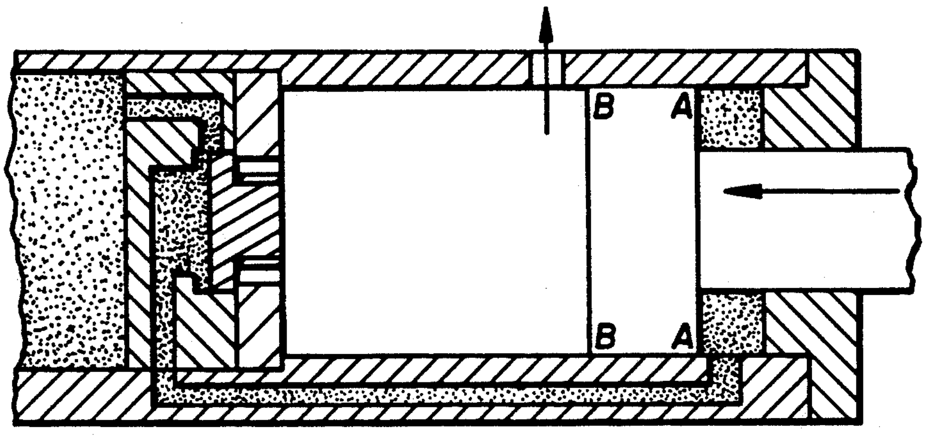
FIG. 5 shows a backward stroke of the same traditional device in FIG. 4.

The pneumatic impacting mechanism with a plunger valve according to the present invention comprises a piston arranged within its cylinder, said piston having a rear air distributing bar and a front air distributing bar, also acting as an impacting head. Said rear air distributing bar being provided with an axially extending air inlet channel, which can be connected alternatively, through a radial channel in the piston, with a pair of inlet channels designed for moving a plunger valve forward or backward. Said cylinder comprising a front chamber and a rear chamber, each provided with its own air inlet and exhaust channels, which in turn cooperate with two annular grooves at both ends of said plunger valve. Said cylinder further comprising a front cover and a rear cover each with an air inlet port in a side wall, to cooperate with the circumference of said front and rear distributing bars, for controlling the quantities of air entering into the respective chambers, and moreover two buffer plungers between said piston and said two covers, to form two buffer chambers.

DETAILED DESCRIPTION OF INVENTION

Following is a detailed description of the present invention. Referring to FIGS. 1 and 2, the high efficiency pneumatic mechanism with a plunger valve according to this invention comprises a piston 2 located within a cylinder (first cylinder) 1, said piston 2 having a front air distributing bar 3 and a rear air distributing bar 4, the former also working as an impacting head of the device. Inside the rear distributing bar 4, there is an axially extending air inlet channel 41, which is connected with a radial air channel 42 in the piston 2. During the movement of the piston 2, the radial air channel 42 can be connected alternatively with a pair of air channels 43 and 44, located within the wall of the cylinder 1. The air channel (first air channel) 43 extends from its inlet port 45 at the rear inner wall of the rear chamber of the first cylinder 1 to the right end (front end) of a plunger valve cylinder (second cylinder) 52, while the air channel (second air channel) 44 extends from its inlet port 46 of the front chamber in the first cylinder to the left end (rear end) of the plunger valve cylinder 52. The inlet channels 41 and 38 are all connected to compressed air source. A rear chamber 29 of the cylinder 1 is provided with an air inlet channel (third air channel) 12 for forward stroke and an air exhaust channel (rear exhaust channel) 60 for backward stroke, and, on the other hand, a front chamber 28 is provided with an air inlet channel (fourth air channel) 11 for backward stroke and an air exhaust channel (front exhaust channel) 59 for forward stroke. The air exhaust channels 59 and 60 can be respectively connected to atmosphere through two annular grooves 71 and 72 of the plunger valve 5. The output portions of the two exhaust channels 59 and 60 are shown by dotted lines in FIGS. 1 and 2. It should be noted that for simplicity all crossing air channels shown in the drawings are considered as being not connected to each other. The plunger valve cylinder 52 and the cylinder 1 are combined together to form a single body of the device. The two-position plunger valve 5 can be moved (between a front position and a rear position) by pressure difference between its two ends, to control the air inlet and exhaust channels of the cylinder 1 during the forward and backward strokes. The air inlet channels and exhaust channels are in an open state when they are aligned with the annular grooves 71 and 72 of the plunger valve 5; otherwise they are closed.

The cylinder 1 is provided with a front cover 19 and a rear cover 49, which have respectively an air inlet port 20 and 21 in the side walls. The front and rear distributing bars 3 and 4, which can slide within a central hole in each of the two covers, have respectively larger (large) portions 17, 18 and smaller (small) portions 15, 16. The lengths of these portions determine the times and quantities of air supply during the forward and backward strokes. When a smaller portion 15 or 16 passes by the air inlet port 20 or 21, compressed air enters the front chamber 28 or the rear chamber 29 of the cylinder 1 through the space left therebetween, as shown by the right part of FIG. 1 or the left part of FIG. 2; when a large portion 17 or 18 passes by said air inlet port 20 or 21, the air supply stops. In this manner, the quantity of compressed air entering into the cylinder can be adjusted by choosing suitable lengths of the mentioned portions according to practical requirements.

A front annular buffer plunger (front plunger buffer) 6 and a rear annular buffer plunger (rear plunger buffer) 7 are provided between the two covers 19, 49 and the piston 2, to form respectively a sealed front buffer chamber 30 and a sealed rear buffer chamber 31, which can be connected with a compressed air source. The two plungers 6 and 7 are subjected to a pressure at the back, and are stopped respectively by shoulders 32 and 33, formed on the inner wall of the cylinder 1. The air inlet channels 11 and 12 radially run in the plungers 6 and 7, respectively, and the plungers 6 and 7 can move outward when they are impacted by the piston 2. The front chamber 30 plays a role of protecting the cylinder when the device is operating in an idle state. As can be seen from the Figures, the front and rear portions of the present device are of substantially symmetrical structure and are operated in a similar manner.

The plunger valve 5, as is shown in FIG. 3, comprises a cylindrical stem with two annular grooves 71, 72 near both ends. The plunger valve 5 is sliding fit with its cylinder 52. The two annular spaces formed between said annular grooves 71, 72 and the plunger valve cylinder 52 serve to open or close alternatively the air inlet channels 11, 12 or exhaust channels 59, 60.

The operation of the present device will be described hereinafter. Referring to FIGS. 1 and 2, a hole 38 in the rear cover 49 and an air channel (connecting air channel) 53 in the cylinder 52 are connected with a compressed air source (not shown in the Figures). The dotted area in the drawings represents a space filled with compressed air.

Supposing that the piston 2 is at an arbitrary position at the beginning of operation. It will move to the position as shown in FIG. 1 under the pressure of compressed air existing in the hole 38 (thereby defining a means for selectively moving the plunger valve). This position represents the state that a forward stroke has finished and a back stroke will begin. The compressed air entering into an air inlet channel 41 of the rear distributing bar 4 is conducted by a radial air channel 42 and an air channel 44 to the left end of the plunger valve cylinder 52, while the right end of the plunger valve cylinder 52 is connected with the rear chamber 29 by an air channel 43. Since the pressure within the rear chamber 29 at this time is approximately equal to atmosphere (work of air expansion finished), the plunger valve 5 is pushed to the right side of the cylinder 52 by the pressure difference between the two ends of said valve 5 (thereby defining a means for selectively moving the plunger valve). The annular grooves 71 and 72 connect the air inlet channel 11 and air exhaust channel 60 for backward stroke with the air channel 53 and atmosphere, respectively, while the air inlet channel 12 and air exhaust channel 59 for forward stroke are shut off by the plunger valve 5. Compressed air gets into the front chamber 28 of the cylinder 1 through the air inlet channel 11 and the annular space 8 between the smaller portion 15 of the front distributing bar 3 and the inner surface of the hole in the front cover 19. In this manner, the piston 2 is pushed backward by the constant pressure of the compressed air.

At this time, the air contained within the rear chamber 29 is exhausted continuously to atmosphere through the air exhaust channel 60 for backward stroke and the annular groove 72 during the whole backward stroke; therefore, the back pressure of the piston 2 is always approximately equal to atmosphere during a backward stroke.

When a larger portion 17 of the front distributing bar 3 passes by the air inlet port 20 to shut it off, the supply of compressed air to the front chamber 28 stops. The quantity of compressed air having already entered the front chamber 28 is determined by the length of the smaller of portion 15 of the front distributing bar 3. This portion of compressed air continues to expand to do work against the piston 2, and the kinetic energy of the piston 2 is increased gradually.

When the pressure within the front chamber 28 is approximately equal to atmosphere, with the energy of the compressed air fully utilized, the radial air channel 42 is connected to the air channel 43, to feed air to the right side of the plunger valve cylinder 52. At the same time, since the left side of the plunger valve cylinder 52 is connected to the front chamber 28 where the pressure has already decreased to atmosphere, the plunger valve 5 moves to the left end of the cylinder 52, as shown in FIG. 2. At this position, the rear chamber 29 is connected with the air inlet channel 12 for forward stroke and the annular groove 72 of the valve 5, and the air exhaust channel 59 for forward stroke is open, while the air inlet channel 11 and air exhaust channel 60 for backward stroke are shut off. Therefore, another forward stroke begins.

At the end of a backward stroke, the piston 2 with considerable kinetic energy impacts upon the rear buffer plunger 7 and pushes the latter backward. The air within the sealed rear buffer chamber 31 is compressed by the backward movement of the rear buffer plunger 7, and an air cushion is formed thereby. The air cushion serves to stop at first the movement of the piston 2 and the plunger 7, and then to transform rapidly its accumulated potential energy into the kinetic energy of a forward movement of the piston 2. Piston 2 is therefore provided with a certain initial speed at the beginning of a forward stroke. This structure enables the device to utilize fully the energy of compressed air during a backward stroke, such as though the effective volume of the cylinder were increased, or in other words, as if the cylinder could be made smaller than a traditional device of the same power level.

FIG. 2 shows the beginning of a forward stroke. Compressed air gets into the rear chamber 29 through the air inlet channel 12 and the smaller portion 16 of the rear distributing bar 4, to push the piston 2 forward. The already expanded air within the front chamber 28 is exhausted to atmosphere through the air exhaust channel 59 for forward stroke, and the pressure within the front chamber 28 is always approximately equal to atmosphere during the whole of a forward stroke. When a larger portion 18 of the rear distributing bar 4 closes the air inlet channel 12 for forward stroke, the compressed air stops entering into the rear chamber 29 and a predetermined quantity of compressed air contained in the rear chamber 29 continues to expand to push the piston 2 forward. The piston 2 reaches its maximum speed when the pressure within the rear chamber 29 becomes approximately equal to atmosphere. The kinetic energy of the piston is outputted by the front distributing bar 3, which is also an impacting head of the device. When the piston 2 returns to its position as shown in FIG. 1, a complete cycle is finished and a new cycle will begin.

In comparison with the traditional impacting mechanism, the present device has the following advantages:

1. The air exhausting manner adopted in this device is a continuous one, i.e., the front and rear chambers of the cylinder are exhausted alternatively, so that the cylinder, when considered as a whole, is always in an exhausting state. In this manner, the compressed air can be fully exhausted after doing work. The back pressure of the piston can be reduced to a level approximately equal to atmosphere, and the compressed air doing work within the cylinder can also expand to a pressure approximately equal to atmosphere.

2. The air supplying manner adopted by this invention is an interrupted one, i.e., compressed air is supplied only during certain periods of the forward and backward strokes, and this is a necessary precondition for doing work through expansion of air.

3. At the back of the cylinder, there is an air buffer chamber, which functions to rapidly transform the piston's kinetic energy, accumulated during a backward stroke, into the kinetic energy in a following forward stroke, thus overcoming the disadvantage of a traditional mechanism, where certain additional energy supplies are needed for converting a piston from a backward movement to a forward movement.

4. Since the pressure of exhausted air is approximately equal to atmosphere, noise during air exhaustion is considerably reduced, as compared with the traditional mechanism; and the operating environment is greatly improved.

To sum it up, with a device according to this invention, not only the compressed air is made full use of, but also the heat efficiency is raised by folds. The present invention is, therefore, a breakthrough in the field of pneumatic impacting tools.

It is, of course, to be understood that the present invention is by no means limited to the preferred embodiment set forth above, but also comprises any modifications within the scope of the appended claims.

What is claimed is:

1. A pneumatic impacting mechanism, comprising:

a first cylinder having a rear end and a front end;

a piston disposed in the cylinder, wherein a rear chamber is defined between the piston and the rear end of the first cylinder, and further wherein a front chamber is defined between the piston and the front end of the first cylinder, the piston being disposed in the cylinder for sliding movement therein between a forward position and a rearward position;

the piston including a rear air distributing bar and a front air distributing bar, the front air distributing bar defines thereon a working head;

the rear air distributing bar having an axially extending air inlet channel formed therein, said air inlet channel being in communication with a continuous supply of compressed air, such that compressured air is continuously supplied to the air inlet channel;

the piston having a radial air channel formed therein, said radial air channel being in communication with the air inlet channel, whereby compressed air in the air inlet channel passes into the radial air channel;

a second cylinder having a respective rear end and a respective front end;

a first air channel extending between and in communication with the rear chamber in the first cylinder and the front end of the second cylinder;

a second air channel extending between and in communication with the front chamber in the first cylinder and the rear end of the second cylinder;

a rear exhaust channel extending between and in communication with the rear chamber and the external ambient atmosphere;

a front exhaust channel extending between and in communication with the forward chamber and the external ambient atmosphere;

whereby when the piston is in the forward position, the rear exhaust channel and the first air channel are open to the rear chamber, the front exhaust channel is blocked by the piston, and the radial air channel formed therein is substantially aligned with the second air channel for providing gaseous communication between the axial air inlet channel and the rear end of the second cylinder via the radial air channel and the second air channel;

further whereby when the piston is in the rearward position, the front exhaust channel and the second air channel are open to the forward chamber, the rear exhaust channel is blocked by the piston and the radial air channel formed therein is substantially aligned with the first air channel for providing gaseous communication between the axial air inlet channel and the front end of the second cylinder via the radial air channel and the first air channel;

a third air channel extending between and in communication with the rear chamber and the rear end of the second cylinder;

a fourth air channel extending between and in communication with the front chamber and the front end of the second cylinder;

a connecting air channel extending between and in communication with the rear end of the second cylinder and the front end of the second cylinder;

a plunger valve disposed in the second cylinder for sliding movement therein between a front position wherein the first air channel, the third air channel and the front exhaust channel are blocked thereby and the second air channel, fourth air channel and rear exhaust channel are open, and a rear position wherein the first air channel, the third air channel and the front exhaust channel are open and the second air channel, fourth air channel and the rear exhaust channel are blocked thereby;

means for selectively moving the plunger valve between the front and rear positions thereof;

the rear air distributing bar having a respective large portion and a small portion, such that with the piston in the forward position thereof, the third air channel is blocked by the said large portion, and further such that with the piston in the rearward position thereof, the third air channel is open; and the front air distributing bar having a respective large portion and a small portion, such that with the piston in the forward position thereof, the fourth air channel is open, and further such that with the piston in the rearward position thereof, the fourth air channel is blocked by the said large portion;

such that air is continuously exhausted from the mechanism via, alternatively, the front and rear chambers thereof, permitting the compressed air to be fully exhausted therefrom after doing work, whereby when considered as a whole, the cylinder is always in an exhausting state, and further such that the back pressure of the piston is reduced to a level approximately equal to that pressure of the ambient atmosphere and the compressed air doing work within the cylinder can also expand to a pressure approximately equal to that pressure of the ambient atmosphere.

2. The pneumatic impacting mechanism of claim 1, wherein the second cylinder and the first cylinder are formed in an integral body, a front cover closing the front end of the first cylinder, and a rear cover covering the rear end of the first cylinder, a front plunger buffer disposed in the first cylinder rearwardly of the front cover for buffering the impact of the piston moving into the forward position thereof and a rear plunger buffer disposed in the first cylinder forwardly of the rear cover for buffeting the impact of the piston moving into the rearward position thereof.

3. The pneumatic impacting mechanism of claim 1, wherein the plunger valve has, at either end thereof, respective annular grooves formed therein, whereby in the front position of the plunger valve one of the annular grooves is aligned with the second air channel, so that the second air channel is open, and further whereby in the rear position, the other of the annular grooves is aligned with the first air channel, so that the first air channel is open.

* * * * *